United States Patent
Sato et al.

(10) Patent No.: US 9,546,679 B2
(45) Date of Patent: Jan. 17, 2017

(54) BEARING SEAT FOR A BALL JOINT AND A BALL JOINT

(71) Applicant: KABUSHIKI KAISHA SOMIC ISHIKAWA, Tokyo (JP)

(72) Inventors: Yasuhiro Sato, Hamamatsu (JP);
Masayuki Mizutani, Hamamatsu (JP);
Takashi Umei, Hamamatsu (JP)

(73) Assignee: Kabushiki Kaisha Somic Ishikawa, Tokyo (JP)

( * ) Notice: Subject to any disclaimer, the term of this patent is extended or adjusted under 35 U.S.C. 154(b) by 0 days.

(21) Appl. No.: 14/383,932

(22) PCT Filed: Feb. 28, 2013

(86) PCT No.: PCT/JP2013/055430
§ 371 (c)(1),
(2) Date: Sep. 9, 2014

(87) PCT Pub. No.: WO2013/137003
PCT Pub. Date: Sep. 19, 2013

(65) Prior Publication Data
US 2015/0063899 A1    Mar. 5, 2015

(30) Foreign Application Priority Data

Mar. 14, 2012 (JP) ................. 2012-058031

(51) Int. Cl.
*F16C 11/06* (2006.01)
(52) U.S. Cl.
CPC ............ *F16C 11/06* (2013.01); *F16C 11/0638* (2013.01); *Y10T 403/32631* (2015.01)

(58) Field of Classification Search
CPC ... F16C 11/06; F16C 11/0638; F16C 11/0623; F16C 11/0628; F16C 11/0633; F16C 11/0614; F16C 11/0657; F16C 11/10; Y10T 403/32737
See application file for complete search history.

(56) References Cited

U.S. PATENT DOCUMENTS 4,430,016 A   2/1984 Matsuoka et al. ............. 403/40
4,564,307 A * 1/1986 Ito ................................ 403/140
(Continued)

FOREIGN PATENT DOCUMENTS

JP    57-019223     2/1982
JP    2005-514242   5/2005
(Continued)

*Primary Examiner* — Jonathan Masinick
(74) *Attorney, Agent, or Firm* — Michael Tobias (57) ABSTRACT

A bearing seat for a ball joint which simplifies the process of joining a housing and a bearing seat and makes it easy to guarantee the stiffness necessary for a ball joint as a whole by making it easy to fill the interior of an undercut groove with a softened or molten material and a ball joint having this bearing seat for a ball joint are provided. The ball joint 100 has a bearing seat in the form of a ball seat 130 which receives a ball portion 113 of a ball stud 110 inside a cast housing 120 so that the ball portion 113 can slidably rotate. The ball seat 130 has an undercut groove 140 in its outer peripheral surface which contacts the inner peripheral surface of the housing 120. The undercut groove 140 is formed so that the inner width $W_2$ of its bottom portion 142 is greater than the opening width $W_1$ of the opening 141 and so that its depth D is shallower than the opening width $W_1$ of the opening 141.

11 Claims, 6 Drawing Sheets

(56) References Cited

U.S. PATENT DOCUMENTS

| | | | |
|---|---|---|---|
| 4,690,581 A * | 9/1987 | Umemoto et al. | 403/133 |
| 4,758,110 A * | 7/1988 | Ito | 403/140 |
| 5,443,323 A * | 8/1995 | Prelat et al. | 403/289 |
| 5,772,337 A * | 6/1998 | Maughan et al. | 384/206 |
| 5,965,045 A * | 10/1999 | Zigliotto | 219/137.31 |
| 6,146,045 A * | 11/2000 | Maughan | 403/165 |
| 6,164,861 A * | 12/2000 | Maughan | 403/135 |
| 6,190,080 B1 * | 2/2001 | Lee | 403/135 |
| RE38,409 E * | 1/2004 | Noiles | 623/22.25 |
| 6,952,905 B2 * | 10/2005 | Nickel et al. | 52/711 |
| 7,357,590 B2 * | 4/2008 | Hoppner et al. | 403/122 |
| 8,123,815 B2 * | 2/2012 | Meridew et al. | 623/22.29 |
| 2004/0130070 A1 | 7/2004 | Abels et al. | 264/328.1 |
| 2008/0138150 A1 | 6/2008 | Budde et al. | 403/135 |
| 2010/0322703 A1 * | 12/2010 | Horwitz | A47C 5/04 403/179 |

FOREIGN PATENT DOCUMENTS

| | | |
|---|---|---|
| JP | 2008-511798 | 4/2008 |
| JP | 2011-225065 | 11/2011 |

* cited by examiner

BEARING SEAT FOR A BALL JOINT AND A BALL JOINT

TECHNICAL FIELD

This invention relates to a bearing seat for a ball joint in which a receiving portion which slidably receives a spherical ball which is formed on the end of a shaft-like stud portion is held inside a cast housing. It also relates to a ball joint having this bearing seat for a ball joint.

BACKGROUND ART

A ball joint for movably connecting shaft-like components to each other is conventionally used in suspensions and steering mechanisms for vehicles such as automobiles. A ball joint is primarily constituted such that a spherical ball portion which is formed on the end portion of a shaft-like stud is slidably received in a cylindrical bearing seat which is held inside a cast housing. The bearing seat is incorporated into the housing as a result of the molding of the housing by previously disposing it as a core inside a mold at the time of casting (die casting) of the housing.

With such a so-called integral-type ball joint, the coefficient of contraction of the material forming the housing (such as an aluminum alloy, magnesium, or zinc) is different from the coefficient of contraction of the material forming the bearing seat (such as a PEEK resin). Therefore, due to gaps which form between the molded housing and the bearing seat, play and looseness develop between the two, and there is a concern of a decrease in the stiffness of the ball joint. Therefore, below-described Patent Document 1, for example, discloses a ball joint which can suppress play and looseness between a housing and a bearing seat by providing undercut grooves in the contact surface between the housing and the bearing seat.

PRIOR ART DOCUMENTS

Patent Document 1: JP 2008-511798 A

SUMMARY OF THE INVENTION

With the undercut grooves of the ball joint described in above-mentioned Patent Document 1, because the undercut grooves have the shape of grooves, it is difficult to fill the rearmost interior portions of the undercut grooves with a softened or molten material when joining the housing and the bearing seat. Therefore, the process of joining the housing and the bearing seat becomes difficult, and there was the problem that it was difficult to guarantee the stiffness of the ball joint as a whole.

The present invention was made in order to cope with the above-described problems, and its object is to provide a bearing seat for a ball joint which simplifies the process of joining a housing and a bearing seat and makes it easy to guarantee the stiffness necessary for a ball joint as a whole by making it easy to fill the interior of an undercut groove with a softened or molten material. It is also an object to provide a ball joint equipped with this bearing seat for a ball joint.

In order to achieve these objects, a characteristic of the present invention is that in a bearing seat for a ball joint which is formed as a tubular member and is held inside a cast housing in a state in which a spherical ball portion which is formed on the end of a shaft-like stud portion is able to slide inside the tubular member, an undercut groove is formed in the outer peripheral surface which contacts the housing, and the undercut groove is formed so that at least a portion thereof located on the bottom side has a width greater than the width of an opening thereof which opens onto the outer peripheral surface of the tubular member which contacts the housing.

According to this characteristic of the present invention which is constituted in this manner, a bearing seat for a ball joint has an undercut groove which is formed so that the width of at least a portion thereof located on the bottom side is greater than the width of an opening on the outer peripheral surface which contacts the housing and so that the depth of the undercut groove is smaller than the width of the opening. Namely, in the bearing seat for a ball joint, the groove depth of the undercut groove is made to correspond to the width of the opening of the groove, so it is possible to prevent misruns due to the depth being excessive compared to the width of the opening. As a result, the bonding force of the bearing seat for a ball joint to a housing can be increased, whereby the stiffness required of a ball joint can be easily guaranteed.

Another characteristic of the present invention is that in the bearing seat for a ball joint, the undercut groove is formed in the circumferential direction of the tubular member and opens at at least one of the two end portions of the tubular member.

According to this other characteristic of the present invention which is constituted in this manner, in the bearing seat for a ball joint, the undercut groove is formed in the circumferential direction of the tubular member and opens at at least one of the two end portions of the tubular member. Therefore, it becomes easier to carry out casting such as die casting of the bearing seat for a ball joint having the undercut groove which forms an undercut shape in cooperation with the opening.

Another characteristic of the present invention is that in the bearing seat for a ball joint, the opening is formed by notching the end portion of the tubular member in which the undercut groove is formed.

According to this other characteristic of the present invention which is constituted in this manner, in the bearing seat for a ball joint, the opening is formed by notching the end portion of the tubular member in which the undercut groove is formed. Therefore, when the housing is cast with the bearing seat for a ball joint disposed therein, molten material can effectively flow into the undercut groove through the opening.

Another characteristic of the present invention is that the bearing seat for a ball joint has at least three openings provided at equal intervals in the circumferential direction.

According to this other characteristic of the present invention which is constituted in this manner, the bearing seat for a ball joint has at least three openings provided at equal intervals in the circumferential direction. Therefore, the bearing seat is coupled to the housing at positions equally spaced in a well balanced manner, whereby a ball stud can be stably held over long periods. In addition, in the bearing seat for a ball joint, when the housing is cast with the bearing seat for a ball joint disposed therein, molten material can easily flow into the undercut groove.

Another characteristic of the present invention is that in the bearing seat for a ball joint, the undercut groove is formed in the axial direction of the stud portion.

According to this other characteristic of the present invention which is constituted in this manner, in the bearing seat for a ball joint, the undercut groove is formed in the axial direction of the stud portion. Namely, it is formed parallel to the lengthwise direction of the bearing seat for a ball joint, which is formed with a tubular or cup shape. As a result, the bearing seat for a ball joint can be prevented from rotating about the axis together with the ball portion of the ball stud.

Another characteristic of the present invention is that the bearing seat for a ball joint has at least three undercut grooves provided at equal intervals in its outer peripheral surface which contacts the housing.

According to this other characteristic of the present invention which is constituted in this manner, the bearing seat for a ball joint has at least three undercut grooves provided at equal intervals in its outer peripheral surface which contacts the housing. As a result, the bearing seat for a ball joint is coupled to the housing at positions equally spaced in a well balanced manner, whereby it can stably hold the ball stud over long periods.

Another characteristic of the present invention is that in the bearing seat for a ball joint, the undercut groove is formed intermittently formed in the outer peripheral surface which contacts the housing.

According to this other characteristic of the present invention which is constituted in this manner, in the bearing seat for a ball joint, the undercut groove is intermittently formed in the outer peripheral surface which contacts the housing. As a result, in the bearing seat for a ball joint, the wall thickness of the portions in which the undercut groove is not formed is greater than that of the portions in which the undercut groove is formed, so the stiffness of the bearing seat for a ball joint itself can be increased.

Another characteristic of the present invention is that in the bearing seat for a ball joint, portions of the bearing seat located adjacent to the opening of the undercut groove which opens onto the outer peripheral surface which contacts the housing have tips each having a curved surface.

According to this other characteristic of the present invention which is constituted in this manner, portions of the bearing seat located adjacent to the opening of the undercut groove which opens onto the outer peripheral surface which contacts the housing have tips each having a curved surface. As a result, in the bearing seat for a ball joint, the thickness of the tips of the portions of the seat adjacent to the opening of the undercut groove can be increased, so loss of the tips of the portions of the seat adjacent to the opening due to melting when casting a molten material for the housing can be decreased.

The present invention can be carried out not only as an invention of a bearing seat for a ball joint, it can also be carried out as an invention of a ball joint including this bearing seat for a ball joint.

Specifically, the ball joint may comprise a ball stud having a spherical ball portion on the end portion of a shaft-like stud portion, a bearing seat for a ball joint as set forth in any one of claims 1-9, and a cast housing which holds the bearing seat for a ball joint. As a result, an effect like that provided by the above-described bearing seat for a ball joint can be expected.

BRIEF DESCRIPTION OF THE DRAWINGS

FIG. 2—(A) and (B) schematically illustrate the ball seat shown in FIG. 1, wherein (A) is a plan view of the ball seat, and (B) is a front view of the ball seat.

FIG. 9—(A) and (B) schematically show the ball seat shown in FIG. 8, wherein (A) is a cross-sectional view of the ball seat as viewed from line A-A in (B), and (B) is a bottom view of the ball seat.

FIG. 10—(A) and (B) schematically show a variation of the ball seat shown in FIG. 8, wherein (A) is a cross-sectional view of the ball seat as viewed from line B-B in (B), and (B) is a bottom view of the ball seat.

MODES FOR CARRYING OUT THE INVENTION

First Mode

Figure 1:
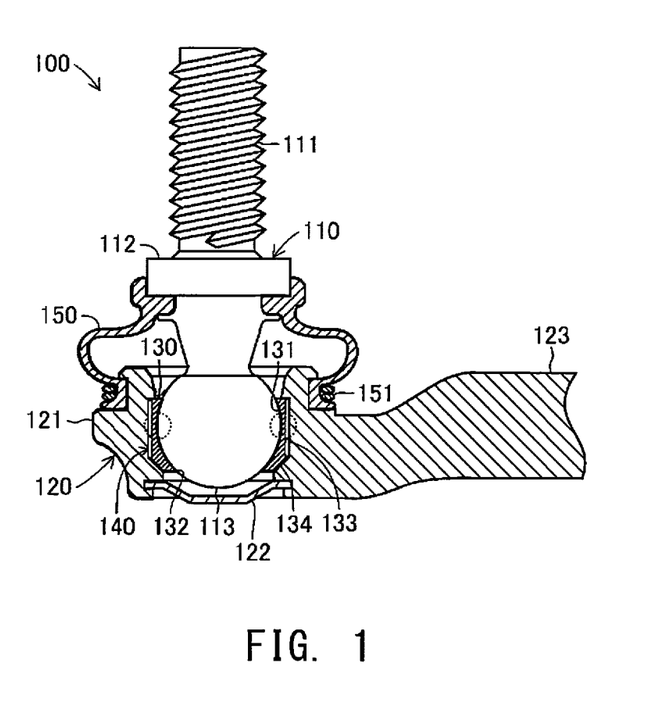
FIG. 1—This is a cross-sectional view schematically showing a vertical cross section of a ball joint having a ball seat which is a bearing seat for a ball joint according to a first mode which is a mode for carrying out the present invention.

Below, a first mode which is a mode for carrying out a bearing seat for a ball joint according to the present invention will be explained while referring to the drawings. FIG. 1 is a cross-sectional view schematically showing a vertical cross section of a ball joint 100 having a ball seat 130 which is a bearing seat for a ball joint according to the present invention. The figures referred to in this description are schematically illustrated with some components exaggerated in order to facilitate an understanding of the present invention. Therefore, the dimensions, proportions and the like of the components may differ from the actual dimensions, proportions, etc.

This ball joint 100 is a joint member for connecting components with each other in a suspension or a steering mechanism employed in a vehicle such as an automobile while permitting the angle between the components to vary. The ball joint 100 shown in FIG. 1 is one of the ball joints provided at both ends of an unillustrated stabilizer link in a suspension.

The ball joint 100 is primarily constituted by a ball stud 110, a housing 120, a ball seat 130, and a dust cover 150. Of these components, the ball stud 110 is made of steel and comprises a ball portion 113 which is formed with a roughly spherical shape on one end of a shaft-like stud portion 111 through a flange portion 112. A male thread for connecting the ball joint 100 to components of an unillustrated steering mechanism is formed on the stud portion 111.

The housing 120 is formed by casting a material such as a non-ferrous metal or steel. It comprises a socket portion 121 which is formed as a roughly cylindrical body and a connecting portion 123 which is formed so as to extend in the horizontal direction from the socket portion 121. In this mode of carrying out the invention, the housing 120 is made of an aluminum alloy, but other materials such as magnesium or zinc can also be used. The socket portion 121 is formed in the shape of cylindrical body with a bottom, with one end portion (the upper end portion in the figure) of the cylindrical body being open and the other end portion (the lower end portion in the figure) being closed off by a plug 122. The inner peripheral portion of the cylindrical body of the socket portion 121 accommodates and holds the ball portion 113 of the ball stud 110 through the ball seat 130.

The plug 122 is a plate-shaped member for closing off one end of the socket portion 121 which is formed with a cylindrical shape. The plug is formed by forming a steel material into the shape of a disc which is concave at its central portion. One end portion (the left end in the figure) of the connecting portion 123 is connected to the socket portion 121, and the other end portion (the right end in the figure) is connected to an unillustrated arm of a stabilizer link. A bearing seat in the form of a ball seat 130 is provided on the inner peripheral portion of the socket portion 121 of the housing 120 between the inner peripheral portion and the ball portion 113 of the ball stud 110 which is held in the inner peripheral portion.

Figure 2:
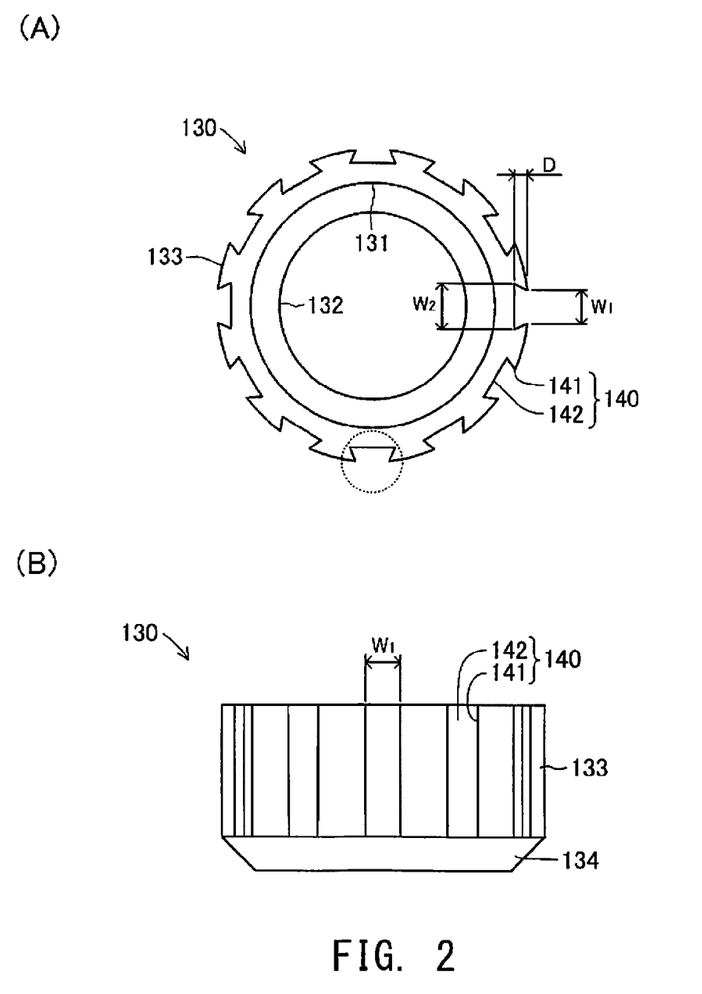

The ball seat 130 is formed with a roughly cylindrical shape having an inner peripheral surface which extends along the spherical surface of the ball portion 113 of the ball stud 110. It holds the ball portion 113 of the ball stud 110 inside the socket portion 121 of the housing 120 such that the ball portion is surrounded while being able to slidably rotate. As shown in detail in FIGS. 2(A) and (B), the ball seat 130 is made of a heat-resistant synthetic resin such as a polyetheretherketone resin (PEEK), a polyimide resin (PI), a polyacetal resin (POM), a polyester resin (PVC), a polyurethane resin (PUR), a polycarbonate resin (PC), a polystyrene resin (PS), a nylon resin (66N, UMC), polypropylene (PP), or the like. A receiving portion 131 which is formed with a spherical shape corresponding to the spherical surface of the ball portion 113 of the ball stud 110 and a hole 132 which extends through the bottom portion of the receiving portion 131 are provided on the inner peripheral surface of the ball seat 130.

A straight portion 133 which extends in a straight line in the axial direction of the stud portion 111 of the ball stud 110 and a tapered portion 134 which is tapered on the lower side of the straight portion 133 in the figure are formed on the outer peripheral surface of the ball seat 130. Undercut grooves 140 are formed on the straight portion 133. The undercut grooves 140 are portions for securing the ball seat 130 inside the housing 120. They are formed in the shape of grooves extending in the axial direction of the stud portion 111 of the ball stud 110.

More specifically, the undercut grooves 140 are formed so that the inner width $W_2$ of the bottom portion 142 is wider than the opening width $W_1$ of the opening 141 which opens onto the outer peripheral surface of the ball seat 130, and so that their depth D is shallower than the opening width $W_1$ of the opening 141. The depth D of the undercut grooves 140 is set so that the wall thickness of the thinnest portions of the ball seat 130 corresponding to the undercut grooves 140 (one such a thinnest portion is located within the dashed-line circle in FIG. 1) is at least one third of the wall thickness of the remaining portion of the ball seat 130. These undercut grooves 140 are formed at twelve equally-spaced locations on the outer peripheral surface of the ball seat 130.

A dust cover 150 which covers the upper portion of the socket portion 121 and the ball portion 113 of the ball stud 110 which is received in the socket portion 121 is provided on the upper portion of the socket portion 121 of the housing 120. The dust cover 150 is made of rubber or a soft synthetic resin or the like which can elastically deform. It is formed with a roughly cylindrical shape which bulges outwards at its central portion. The stud portion 111 of the ball stud 110 passes through one open end (on the upper side of the figure) of the dust cover 150, and the dust cover 150 is secured by elastic force to the lower portion of the stud portion 111. The other open end (on the lower side in the figure) of the dust cover 150 is secured by a securing ring 151 so as to fit onto the outer peripheral portion of the socket portion 121. In this manner, foreign matter is prevented from infiltrating into the ball seat 130.

Manufacture of the Ball Joint 100

The manufacture of a ball joint 100 which is constituted in this manner will be explained. In this explanation of a manufacturing process for the ball joint 100, manufacturing steps which are not directly related to the present invention will be suitably omitted.

First, an operator prepares the ball stud 110 and the ball seat 130, which are components of the ball joint 100. The undercut grooves 140 are formed in the outer peripheral surface of the ball seat 130. Next, the operator sets these parts in an unillustrated mold for molding the housing 120. The ball seat 130 is set in the mold such that the ball portion 113 of the ball stud 110 is held inside the receiving portion 131 so as to be able to slidably rotate.

Next, the operator casts an aluminum alloy into the mold in which the ball stud 110 and the ball seat 130 have been set (carries out aluminum die casting.) As a result, a housing 120 equipped with the ball stud 110 and the ball seat 130 is integrally molded. At the time of casting the housing 120, the molten aluminum alloy which reaches the outer peripheral surface of the ball seat 130 flows into the undercut grooves 140. The undercut grooves 140 are formed so that their depth D is shallower than the opening width $W_1$ of the openings 141, so the molten alloy readily flows into the undercut grooves, and the undercut grooves can be filled with the aluminum alloy even if the injection pressure of the aluminum alloy is lower than is conventional.

Figure 3:
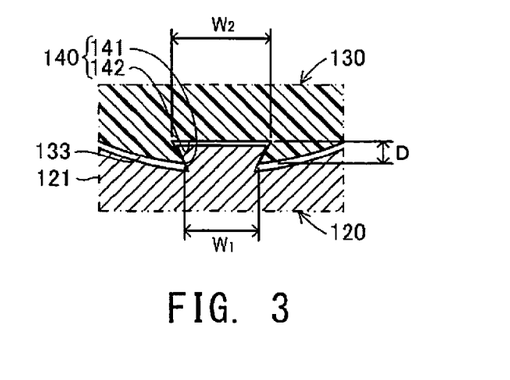
FIG. 3—This is an enlarged partial cross-sectional view which enlarges the cross section of the contact portion between a housing and a ball seat and shows the region inside the dashed-line circle in FIG. 2(A) for explaining the step of connecting the housing and the ball seat shown in FIG. 1.

When the mold is cooled, as shown in FIG. 3, the ball seat 130 which is heated by the molten aluminum alloy has a different coefficient of contraction than the aluminum alloy, and specifically, it has a larger coefficient of contraction than the aluminum alloy. Therefore, at the time of cooling of the mold, gaps sometimes develop between the inner peripheral surface of the socket portion 121 of the housing 130 and the outer peripheral surface of the ball seat 130. However, since the portions of the ball seat 130 located adjacent to the openings 141 of the undercut grooves 140 engage with the housing 130 which flows into the undercut position 140 and solidifies, the ball seat 130 is strongly connected to the inner peripheral surface of the socket portion 121 of the housing 130.

Next, the operator removes the housing 120 which is integrally formed with the ball stud 110 and the ball seat 130 from the mold, and then he prepares the plug 122 and dust cover 150 and mounts them on the housing 120. Specifically, the operator sets the plug 122 in an unillustrated jig so that the plug is disposed in the opening at the lower side of the housing 120 and crimps a portion of the housing 120 around the opening to secure the plug 122. In addition, the operator fits one end portion (on the upper side in the figures) of the dust cover 150 on the outer peripheral portion of the ball stud 110, and he fits the other end portion (on the lower side in the figures) of the dust cover 150 on the outer peripheral portion of the upper portion of the housing 120. Then, the operator sets a securing ring 151 on the dust cover 150 which is fit onto the upper outer peripheral portion of the housing 120 to secure the dust cover 150 on the housing 120, whereby the ball joint 100 is completed.

Operation of the Ball Joint 100

Next, the operation of the ball joint 100 which is constituted in this manner will be explained. In this first mode of carrying out the invention, an explanation will be given with respect to an example in which the ball joint 100 is incorporated into a suspension of a vehicle such as an automobile. A suspension is an apparatus which maintains the running stability and steering stability of a vehicle by attenuating vibrations in the vehicle from the road surface and making the wheels contact the road surface with certainty. The ball joint 100 supports the load from the vehicle while allowing the ball stud 110 to rotate or swing in a prescribed direction in the suspension.

The ball joint 100 which is mounted on the unillustrated vehicle allows the ball stud 110 to swing in a prescribed direction in accordance with up and down movement as the vehicle travels. As a result, the ball portion 113 which is housed within the receiving portion 131 of the ball seat 130 slidably rotates within the receiving portion 131 of the ball seat 130 in a prescribed direction corresponding to the direction of swinging of the ball stud 110. The ball seat 130 is strongly connected to the socket portion 121 by the undercut grooves 140 within the socket portions 121 in the housing 120, so play or looseness of the ball seat with respect to the socket portion 121 does not develop. As a result, a decrease in the stiffness of the ball joint 100 is prevented. In addition, as the ball seat 130 is formed so that the undercut grooves 140 are parallel to the axial direction of the ball stud 110, the ball seat 130 is prevented from rotating together with the ball portion 113 about the axis of the ball stud 110.

As can be understood from the above-description of a method of operation, according to the above-described first mode of carrying out the invention, the ball seat 130 includes undercut grooves 140 formed on the outer peripheral surface which contacts the housing 120. The undercut grooves 140 are formed with an inner width $W_2$ of the bottom portion 142 which is larger than the opening width $W_1$ of the openings 141 and with a depth D which is shallower than the opening width $W_1$ of the openings 141. Namely, the depth D of the undercut grooves 140 is made to correspond to the opening width $W_1$ of the openings 141 of the grooves, so it is possible to prevent misruns of an aluminum alloy due to the depth being too great with respect to the opening width $W_1$ of the openings 141. As a result, the coupling force between the ball seat 140 and the housing 120 can be increased, whereby the stiffness necessary for a ball joint 100 can be guaranteed. It was confirmed by the present inventors that by forming the depth D of the undercut grooves 140 to be less than or equal to the opening width $W_1$ of the openings 141 of the grooves, so called misruns are suppressed and the housing 120 and the ball seat 130 can be accurately connected to each other with certainty.

In carrying out the present invention, one is not limited to the above-described first mode, and various modifications are possible as long as they do not deviate from the objects of the present invention. In the drawings used to explain the following variations, components which are the same as in the above-described first mode are affixed with the same reference numerals, and their explanation will be omitted.

In the above-described first mode, there are twelve undercut grooves 140 provided at equal intervals on the outer peripheral surface of the ball seat 130. However, the number and locations of the undercut grooves 140 are not limited to those in the above-described first mode as long as they can connect the ball seat 130 to the housing 120. For example, it is sufficient to provide at least one undercut groove 140 on the outer peripheral surface of the ball seat 130. When a plurality of undercut grooves 140 are formed, by disposing at least three at equal intervals on the outer peripheral surface of the ball seat 130, the ball seat 130 can be connected to the housing 120 with good balance by uniformly distributing the coupling force.

In the above-described first mode, the undercut grooves 140 are continuously formed in the straight portion 133 on the outer peripheral surface of the ball seat 130. However, it is sufficient for the undercut grooves 140 to be provided on the outer peripheral surface of the ball seat 130 contacting the housing 120. Accordingly, for example, the undercut grooves 140 may be formed on the tapered portion 134 on the outer peripheral surface of the ball seat 130. With such an arrangement, the ball seat 130 can be more strongly connected to the housing 120 since the tapered portion 134 is a portion which opposes the portion which directly receives the load in the axial direction from the ball stud 110 inside the receiving portion 131 of the ball seat 130.

When forming the undercut grooves 140 on the outer peripheral surface of the ball seat 130, it is not always necessary for them to be formed continuously, and they may be formed intermittently on the outer peripheral surface of the ball seat 130. As a result, the wall thickness of the portions in which the undercut grooves 140 are not formed is made larger than the wall thickness of the portions in which the undercut grooves 140 are formed, whereby the stiffness of the ball seat 140 itself can be increased.

In the above-described first mode, the undercut grooves 140 are formed parallel to the axial direction of the ball stud 110 on the outer peripheral surface of the ball seat 130. However, as long as the undercut grooves 140 are formed on the outer peripheral surface of the ball seat 130, they are not necessarily limited to the above-described first mode. For example, the undercut grooves 140 may be continuously or intermittently formed in an annular shape in the circumferential direction on the outer peripheral surface of the ball seat 130. In this case, a plurality of undercut grooves 140 may be disposed parallel to each other or may be staggered in the axial direction of the ball stud 110. An example in which the undercut grooves 140 are formed in the circumferential direction on the outer peripheral surface of the ball seat 130 will be described below as a second embodiment.

Figure 4:
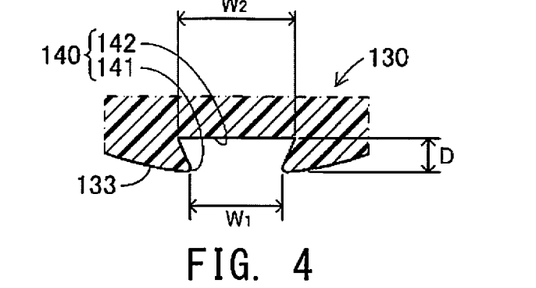
FIG. 4—This is an enlarged partial cross-sectional view showing the cross section of a portion of a ball seat which is a bearing seat for a ball joint according to a variation of the present invention, the portion corresponding to the portion inside the dashed-line circle in FIG. 2(A).

In the above-described first mode, the tips of the portions of the ball seat 130 located adjacent to the openings 141 of the undercut grooves 140 are formed with a pointed shape. However, the shape of the portions of the ball seat 130 located adjacent to the openings 141 of the undercut grooves 140 is not limited to that in the above-described first mode, and as shown in FIG. 4, for example, they can be formed with a curved surface. As a result, the thickness of the tips of the portions of the ball seat 130 located adjacent to the openings 141 of the undercut grooves 140 of the ball seat 130 can be increased, and loss of the tips of the portions located adjacent to the openings 141 due to melting at the time of casting a molten aluminum alloy can be decreased. In FIG. 4, a cross-sectional view is shown in order to increase understanding.

In the above-described first mode, the undercut grooves 140 are formed with a conical or pyramidal shape which slopes so as to widen from the opening 141 towards both end portions of the bottom portion 142. However, the undercut grooves 140 are not necessarily limited to the above-described first mode as long as the inner width $W_2$ of at least a portion of each undercut grooves 140 on the side toward the bottom portion 142 is greater than the opening width $W_1$ of the opening 141 and as long as they have a depth D which is shallower than the opening width $W_1$ of the openings 141.

Figure 5:
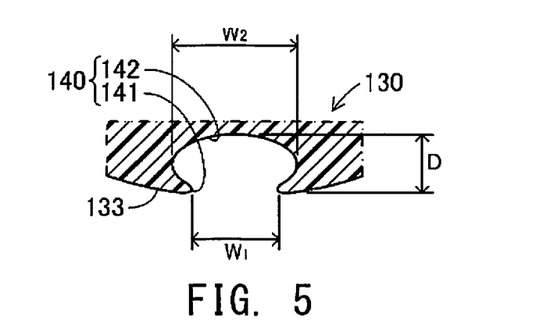
FIG. 5—This is an enlarged partial cross-sectional view showing a cross section of a portion of a ball seat which is a bearing seat for a ball joint according to another variation of the present invention, the portion corresponding to the portion inside the dashed-line circle in FIG. 2(A).
Figure 6:
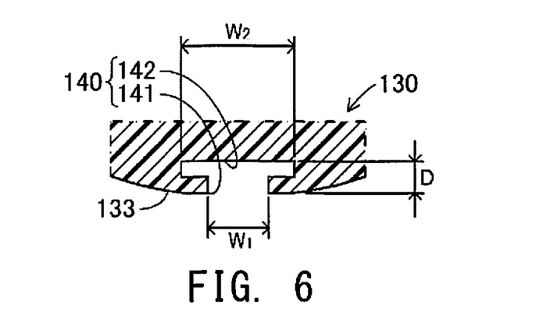
FIG. 6—This is an enlarged partial cross-sectional view showing a cross section of a portion of a ball seat which is a bearing seat for a ball joint according to another variation of the present invention, the portion corresponding to the portion inside the dashed-line circle in FIG. 2(A).
Figure 7:
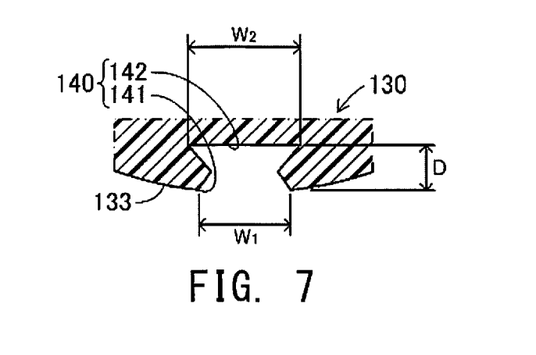
FIG. 7—This is an enlarged partial cross-sectional view showing a cross section of a portion of a ball seat which is a bearing seat for a ball joint according to another variation of the present invention, the portion corresponding to the portion inside the dashed-line circle in FIG. 2(A).

For example, as shown in FIG. 5, the undercut grooves 140 can be formed so that the bottom portion 142 has the shape of a curved surface. In addition, as shown in FIG. 6, for example, the undercut grooves 140 can be formed such that portions of the seat 130 located adjacent to the opening 141 have a prescribed thickness, and a space with a rectangular cross section and a width which is greater than the opening width $W_1$ of the opening 141 is formed on the side toward the bottom portion 142. In addition, as shown in FIG. 7, for example, the undercut grooves 140 can be formed so that the wall surfaces slope from both ends of the bottom portion 142 so that the width become narrower than the opening width $W_1$ and then slope so as to increase the width towards the opening 141. As a result, the same effects as with the above-described first mode can be expected. FIGS. 5-7 are shown in cross section in order to facilitate understanding.

Second Mode for Carrying Out the Invention

Figure 8:
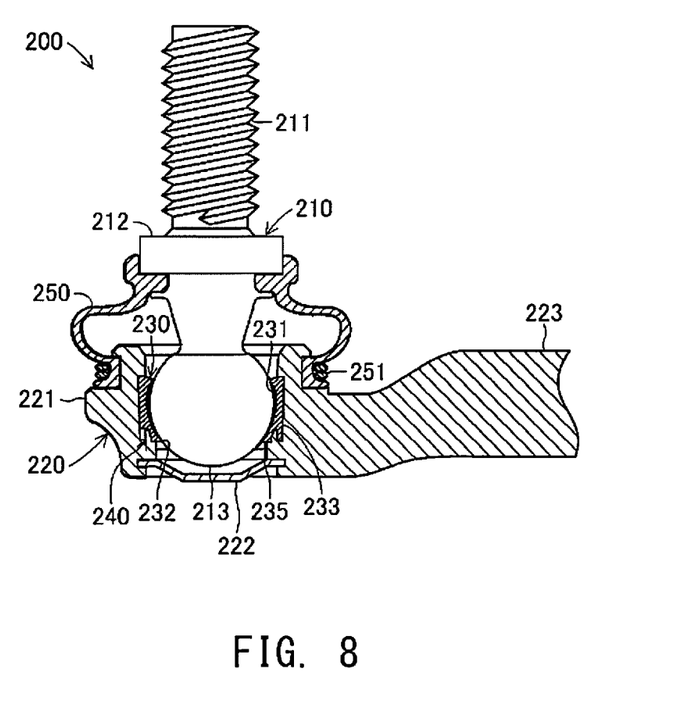
FIG. 8—This is a cross-sectional view schematically showing a vertical cross section of a ball joint having a ball seal which is a bearing seat for a ball joint according to a second mode which is a mode for carrying out the present invention.

Next, a second mode which is another mode for carrying out a bearing seat for a ball joint according to the present invention will be explained while referring to the drawings. FIG. 8 is a cross-sectional view schematically showing a vertical cross section of a ball joint 200 having a ball seat 230 which is a bearing seat for a ball joint according to the present invention. In the explanation of this second mode, an explanation will be given primarily of portions which differ from the above-described first mode, while structure which is the same as in the above-described first mode is affixed with corresponding reference numbers (increased by 100), and an explanation of its operation will be suitably omitted.

A ball joint 200 in this second mode differs from the ball joint 100 in the above-described first mode with respect to the manner of forming the undercut grooves 240 which are formed in the ball seat 230.

Figure 9:
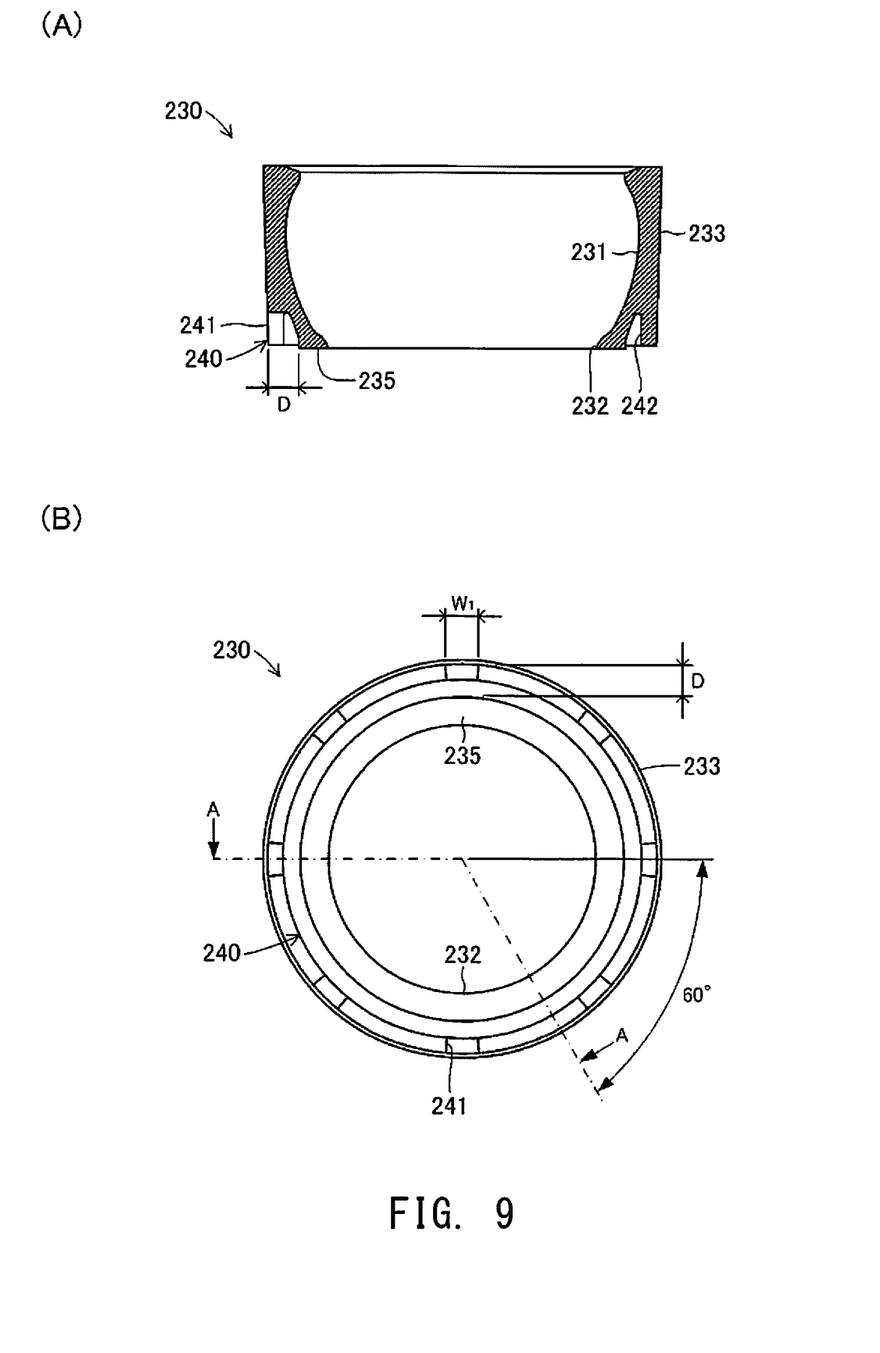

Namely, as shown in detail in FIGS. 9(A) and (B), the ball seat 230 in this second mode is formed with a roughly cylindrical shape having an inner peripheral surface which extends along the spherical surface of a ball portion 213 of a ball stud 210, and it is held inside a socket portion 221 of a housing 220 so as to surround the ball portion 213 of the ball stud 210 so that the ball portion 213 can slidably rotate. This ball seat 230 is made of the same resin as the ball seat 130 in the first mode. On its inner peripheral surface, it is formed with a receiving portion 231 which is formed with a spherical shape corresponding to the spherical surface of the ball portion 213 of the ball stud 210 and a hole 232 which passes through the bottom portion of the receiving portion 231.

A straight portion 233 which extends in a straight line along the axial direction of the stud portion 211 of the ball stud 210 is formed on the outer peripheral surface of the ball seat 230. The straight portion 233 is formed with an outer diameter which decreases towards the lower end in the figure in order to achieve a so-called draft at the time of casting. In addition, an undercut groove 240 is formed in a bottom end portion 235 of the ball seat 130 to be located on the outer side of the hole 232, which portion has a bottom end surface opposing the plug 222 on the lower side in the figure.

The undercut groove 240 rigidly connects the ball seat 230 inside the housing 220. It is constituted by a groove which extends in the shape of a ring in the circumferential direction of the ball seat 230, which comprises a tubular member. The undercut groove 240 is formed such that the length (namely, the circumference) of the undercut groove 240 to be compared with the opening width $W_1$ of the openings 241 formed by notching the straight portion 233 on the outer side of the undercut groove 240 is greater than the opening width $W_1$ (the undercut groove 240 has an annular shape in this second mode) and so that the depth D which is the distance to the bottom portion 242 opposing the openings 241 (in other words, the groove width of the undercut groove 240) is shallower than the opening width $W_1$ of the openings 241.

The depth D of the undercut groove 240 is the distance from the outer surface of the straight portion 233 onto which the openings 241 open to the bottom portion 242 of the undercut groove 240 opposing the openings 241. The groove width and the groove depth as viewed from the bottom end surface of the undercut groove 240 are set to be within a range which can guarantee the stiffness of the receiving portion 231 and the straight portion 233. The undercut groove 240 is formed with a conical or pyramidal shape which tapers from the bottom end portion 235 by forming the undercut groove 240 such that its inner and outer wall surfaces extend along the receiving portion 231 and the straight portion 233, respectively. The openings 241 which constitute the undercut groove 240 are formed in eight equally-spaced locations on the outer peripheral surface of the ball seat 230.

Manufacture of the Ball Joint 200

The manufacture of the ball joint 200 which is constituted in this manner will be explained. In explaining the manufacturing steps for the ball joint 200, manufacturing steps which are not directly related to the present invention will be suitably omitted.

First, an operator forms the ball seat 230, which is a component of the ball joint. Specifically, the operator forms the ball seat 230 by injection molding of a resin using an unillustrated injection molding machine. The ball seat 230 is formed so that it opens at its bottom end portion 235 and so that it extends in the circumferential direction of the ball seat 230. Therefore, it is easy to carry out injection molding of the ball seat 230 having an undercut groove 240 which forms an undercut shape in cooperation with the openings 241.

Next, the operator prepares the ball stud 210, which is another component of the ball joint 200. Then, the operator sets the ball stud 210 and the ball seat 230 in an unillustrated mold for molding the housing 220 and forms the housing 220 by casting an aluminum alloy into this mold (by performing aluminum die casting). As a result, a housing 220 including the ball stud 210 and the ball seat 230 is integrally molded.

At the time of casting the housing 220, the molten aluminum alloy which reaches the outer peripheral surface of the ball seat 230 and more specifically the bottom end portion 235 flows into the undercut groove 240. The undercut groove 240 is formed so that it opens onto the bottom end portion 235 and so that its depth D is shallower than the opening width $W_1$ of the openings 241. Therefore, the undercut groove can be effectively filled using an injection pressure for the aluminum alloy which is lower than conventional.

At the time of cooling of the mold, in the same manner as in the above-described first mode, the ball seat 230 which is heated by the molten aluminum alloy has a different coefficient of contraction from the aluminum alloy and more specifically it has a larger coefficient of contraction than the aluminum alloy. Therefore, at the time of cooling of the mold, a gap sometimes develops between the inner peripheral surface of the socket portion 221 of the housing 220 and the outer peripheral surface of the ball seat 230. However, when portions of the ball seat 230 around the openings 241 of the undercut 240 contract, the ball seat 230 is engaged with the housing 220 which flows into the undercut 240 and solidifies, so the ball seat 230 is firmly connected to the inner peripheral surface of the socket portion 221 of the housing 220.

Next, the operator removes the housing 220 which is integrally equipped with the ball stud 210 and the ball seat 230 from the mold. He then prepares the plug 222 and the dust cover 250 and mounts them on the housing 220 to complete the ball joint 200.

Operation of the Ball Joint 200

Next, the operation of a ball joint 200 which is constituted in this manner will be explained. In the same manner as in the above-described first mode, the second mode will be explained with respect to an example in which the ball joint 200 is incorporated into a suspension of a vehicle such as an automobile.

Specifically, when the ball joint 200 is mounted on an unillustrated vehicle, the ball stud 210 swings in a prescribed direction in accordance with the up and down movement at the time of vehicle travel. As a result, the ball portion 213 which is received in the receiving portion 231 of the ball seat 230 slidably rotates inside the receiving portion 231 of the ball seat 230 in a prescribed direction corresponding to the direction of swinging of the ball stud 210. The ball seat 230 is firmly connected to the socket portion 221 by the undercut groove 240 inside the socket portion 221 of the housing 220, so play or looseness of the ball seat with respect to the socket portion 221 does not develop, and a decrease in the stiffness of the ball joint 200 is prevented. In addition, the openings 241 of the undercut groove 240 are formed parallel to the axial direction of the ball stud 210, so the ball seat 230 is prevented from rotating together with the ball portion 213 around the axis of the ball stud 210.

As can be seen from the above explanation of the method of operation, according to the second mode of carrying out the invention, the undercut groove 240 is formed in the circumferential direction of the ball seat 230, which is formed from a tubular member, and opens at the bottom end portion 235 of the ball seat 230. Therefore, it becomes easier to carry out casting such as die casting of the ball seat 230 having the undercut groove 240 which forms an undercut shape in cooperation with the openings 241. In addition, the openings 241 of the ball seat 230 are formed by notching part of the bottom end portion 235 on the side in which the undercut groove 240 is formed, so when casting the ball seat 230 to form the housing 220, molten metal can be effectively led into the undercut groove 240 through the openings 241. In addition, the ball seat 230 has openings 241 formed at eight equally-spaced locations in the circumferential direction of the ball seat 230. Therefore, the ball seat is coupled to the housing 220 at positions equally spaced in a well balanced manner, whereby the ball stud 210 can be stably held over long periods. In addition, when the housing 220 is cast with the ball seat 230 disposed therein, molten metal can readily flow into the undercut groove 240.

In carrying out the present invention, one is not limited to the above-described second mode, and various modifications are possible as long as they do not deviate from the objects of the present invention. In the drawings used to explain the following variations, the same components as in the above-described second mode are affixed with the same reference numbers, and an explanation thereof will be omitted.

In the above-described second mode of carrying out the invention, the openings 241 of the undercut groove 240 are formed at eight equally-spaced locations in the bottom end portion 235 of the ball seat 130. However, as long as the ball seat 230 can be connected to the housing 220, the number and locations of the openings 241 are not limited to those in the above-described second mode. For example, it is sufficient to provide at least one opening 241 in the end portion of the ball seat 230 in which the undercut groove 240 is formed. In addition, when a plurality of openings 241 are formed, by providing at least three equally-spaced openings 241 in the end portion of the ball seat 230 in which the undercut groove 240 is formed, the ball seat 230 can be connected to the housing 220 with good balance by equally distributing the connecting force.

Figure 10:
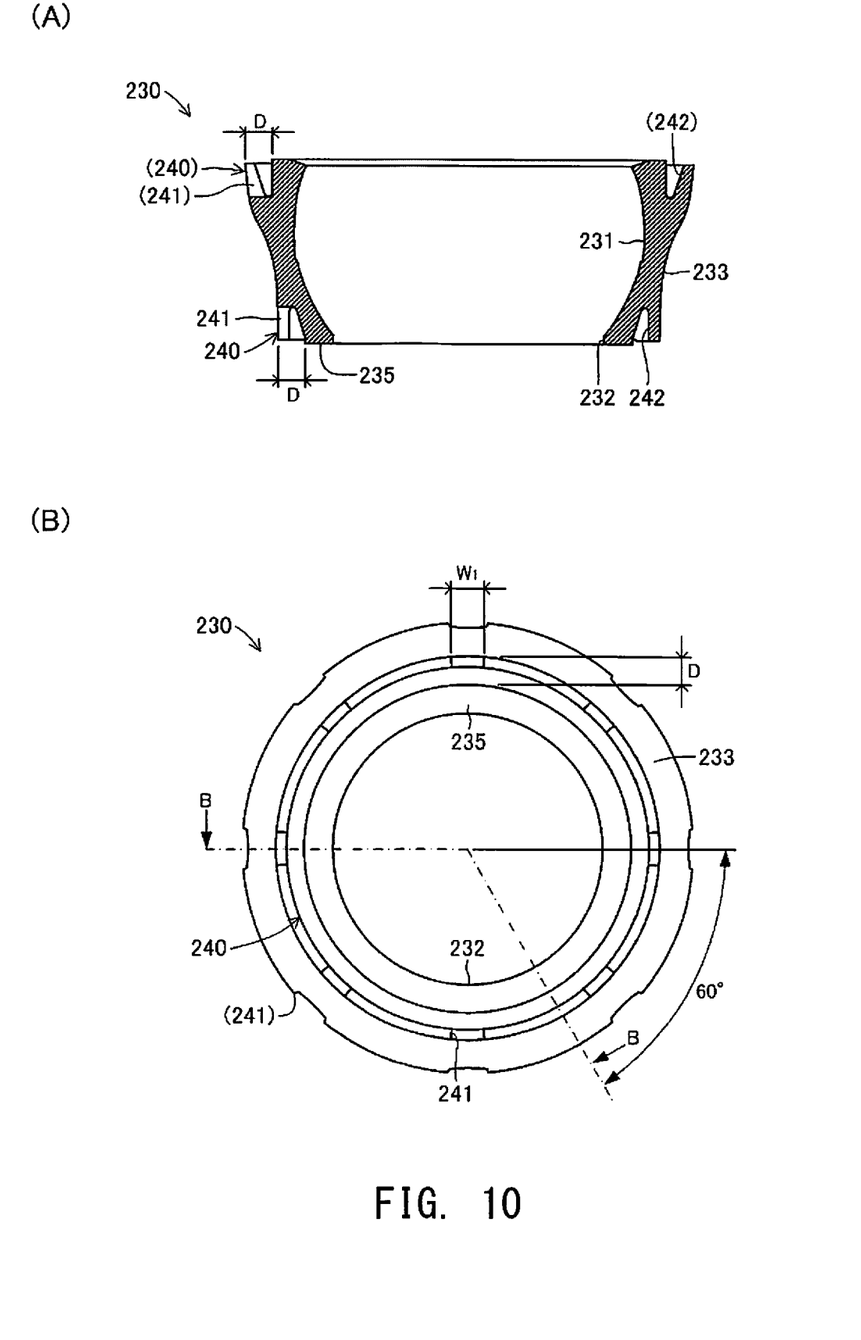

In the above-described second mode, the undercut groove 240 is provided in the bottom end portion 235 of the ball seat 230 which comprises a tubular member. However, it is sufficient for the undercut groove 240 to be formed such that it opens on at least one of the two ends of the ball seat 230 which comprises a tubular member and such that it extends in the circumferential direction of the ball seat 230. Accordingly, as shown in FIGS. 10(A) and (B), for example, undercut grooves 240 can be formed in both end portions of a tubular ball seat 230. In the ball seat 230 shown in FIGS. 10(A) and (B), the straight portion 233 is formed so that its outer diameter increases towards the upper end in the drawing in order to provide a so-called draft at the time of casting. In addition, an undercut groove 240 can be formed just in the end which is closest to the stud portion 211 of the tubular ball seat 230.

In the above-described second mode, the undercut groove 240 is formed in the shape of a continuous circular groove on the bottom end portion 235 of the ball seat 230. However, the undercut groove 240 may be an intermittent groove on the bottom end portion 235 of the ball seat 230.

In the above-described second mode, the openings 241 of the undercut groove 240 have a prescribed length from the outer surface of the straight portion 233. However, as long as the openings 241 communicate with the interior of the undercut groove 240, the openings are not necessarily limited to those in the above-described second mode. For example, it is possible to use shapes like those shown in FIG. 4, 5, or 7 in the above-described first mode of carrying out the invention.

In the above-described first mode and second mode of carrying out the invention, the ball joint 100 or 200 is used in a steering mechanism. However, a ball joint 100 or 200 according to the present invention is of course not limited thereto. This ball joint 100 or 200 can be widely used in a steering mechanism for a vehicle such as an automobile as well as in a suspension or the like.

EXPLANATION OF SYMBOLS $W_1$: opening width
$W_2$: inner width

D: depth
100: ball joint
110: ball stud
111: stud portion
112: flange portion
113: ball portion
120: housing
121: socket portion
122: plug
123: connecting portion
130: ball seat
131: receiving portion
132: hole
133: straight portion
134: tapered portion
140: undercut groove
141: opening
142: bottom portion
150: dust cover
151: securing ring
200: ball joint
210: ball stud
211: stud portion
212: flange portion
213: ball portion
220: housing
221: socket portion
222: plug
223: connecting portion
230: ball seat
231: receiving portion
232: hole
233: straight portion
235: bottom end portion
240: undercut groove
241: opening
242: bottom portion
250: dust cover
251: securing ring

The invention claimed is:

1. A bearing seat for a ball joint comprising:
a tubular body having an interior surface shaped for slidably receiving a ball-shaped member, an outer peripheral surface, first and second lengthwise ends respectively defining first and second extreme lengthwise ends of the bearing seat, and a first end face at the first lengthwise end of the tubular body which faces away from the second lengthwise end of the tubular body in a lengthwise direction of the tubular body; and
one or more undercut grooves formed in the tubular body, each of which opens onto the first end face of the tubular body and includes an opening which opens onto the outer peripheral surface of the tubular body, each undercut groove having an interior width measured in a circumferential direction of the tubular body which is greater than a circumferential width of the opening measured in the circumferential direction of the tubular body on the outer peripheral surface of the tubular body and having a depth measured in a radial direction of the tubular body from a radially inner surface of the undercut groove to the outer peripheral surface of the tubular body which is less than the circumferential width of the opening.

2. A bearing seat as claimed in claim 1 including at least three of the undercut grooves spaced from each other at equal intervals in the circumferential direction of the tubular body.

3. A bearing seat as claimed in claim 1 wherein the opening of each undercut groove has tips with a curved surface.

4. A bearing seat as claimed in claim 1 wherein the tubular body has a tapered portion adjoining the second lengthwise end, and each of the undercut grooves extends continuously from the first lengthwise end to the tapered portion of the tubular body and terminates at the tapered portion.

5. A ball joint comprising:
a bearing seat as claimed in claim 1;
a ball stud having a spherical ball portion slidably received by the interior surface of the tubular body of the bearing seat; and
a cast housing which is integrally molded around the bearing seat.

6. A bearing seat for a ball joint comprising:
a tubular body having an interior surface shaped for slidably receiving a ball-shaped member, an outer peripheral surface, first and second lengthwise ends, and a first end face at the first lengthwise end which faces away from the second lengthwise end; and
a first undercut groove which is formed in the first end face of the tubular body, the first undercut groove including one or more openings each of which opens onto the outer peripheral surface of the tubular body, the first undercut groove having an interior length measured in a circumferential direction of the tubular body along a radially inner surface of the first undercut groove which is greater than a circumferential width of each of the openings measured in the circumferential direction of the tubular body on the outer peripheral surface of the tubular body.

7. A bearing seat as claimed in claim 6 wherein the first undercut groove includes at least three of the openings spaced at equal intervals around the periphery of the tubular body in the circumferential direction of the tubular body.

8. A bearing seat as claimed in claim 7 wherein the first undercut groove extends in a circle completely around an axial center of the tubular body.

9. A bearing seat as claimed in claim 6 wherein the first undercut groove extends along an arc of a circle having a center coinciding with an axial center of the tubular body.

10. A bearing seat as claimed in claim 6 wherein:
the tubular body has a second end face at the second lengthwise end which faces away from the first lengthwise end; and
the bearing seat includes a second undercut groove which is formed in the second end face, the second undercut groove including an opening which opens onto the outer peripheral surface of the tubular body, the second undercut groove having an interior length measured in the circumferential direction of the tubular body measured along a radially inner surface of the second undercut groove which is greater than a circumferential width of the opening of the second undercut groove measured in the circumferential direction of the tubular body on the outer peripheral surface of the tubular body.

11. A ball joint comprising:
a bearing seat as claimed in claim 6;
a ball stud having a spherical ball portion slidably received by the interior surface of the tubular body of the bearing seat; and
a cast housing which is integrally molded around the bearing seat.

* * * * *